UNITED STATES PATENT OFFICE.

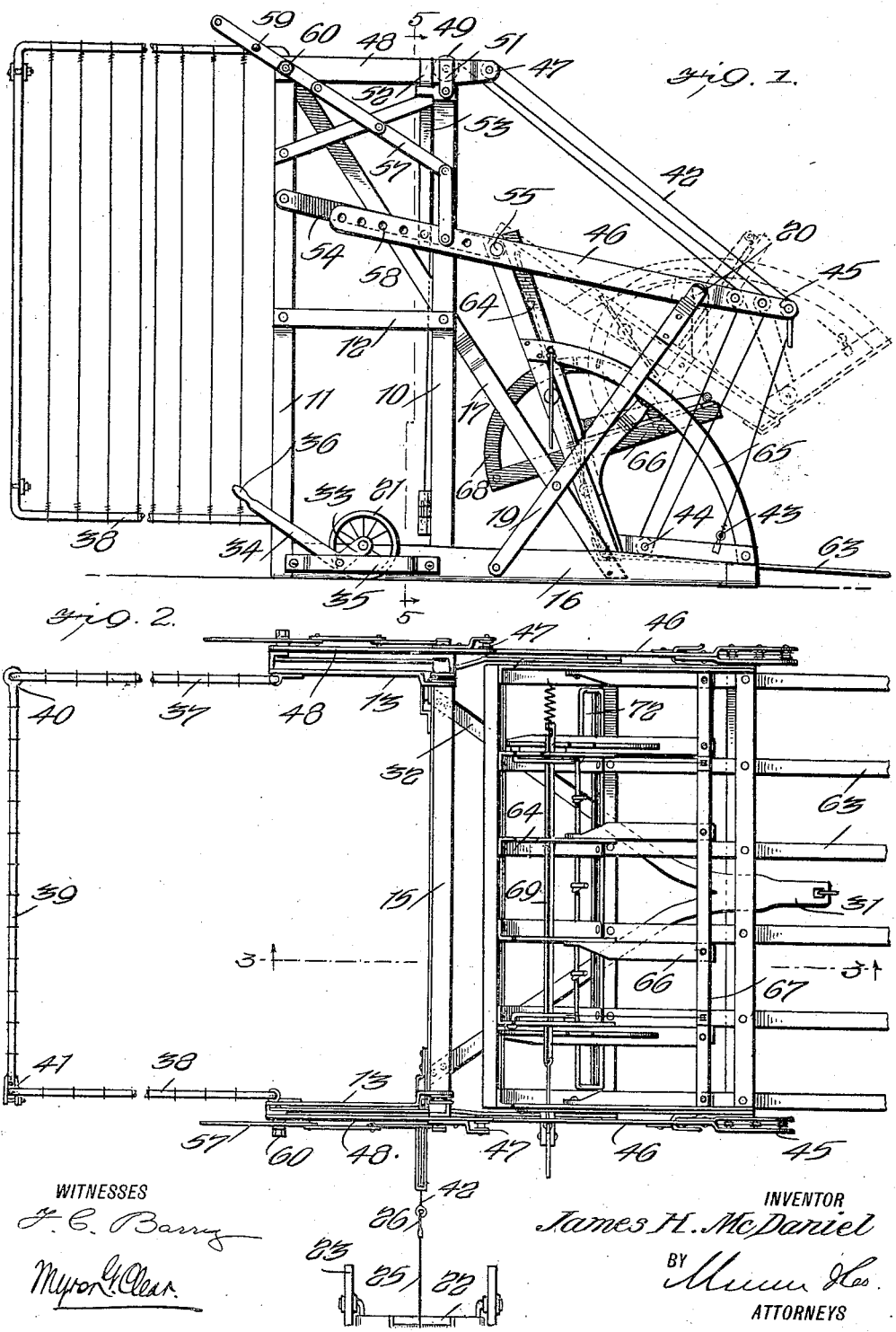

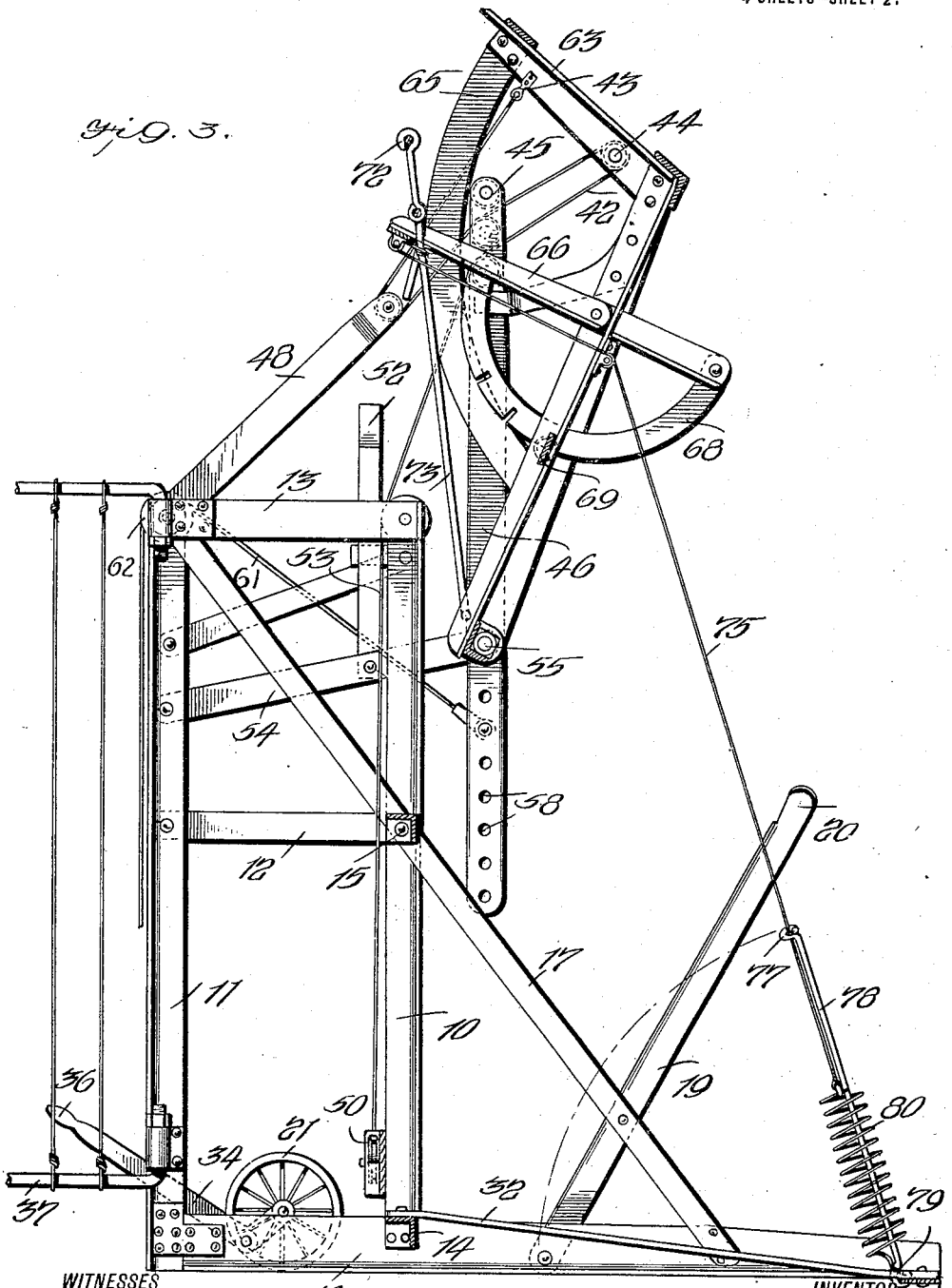

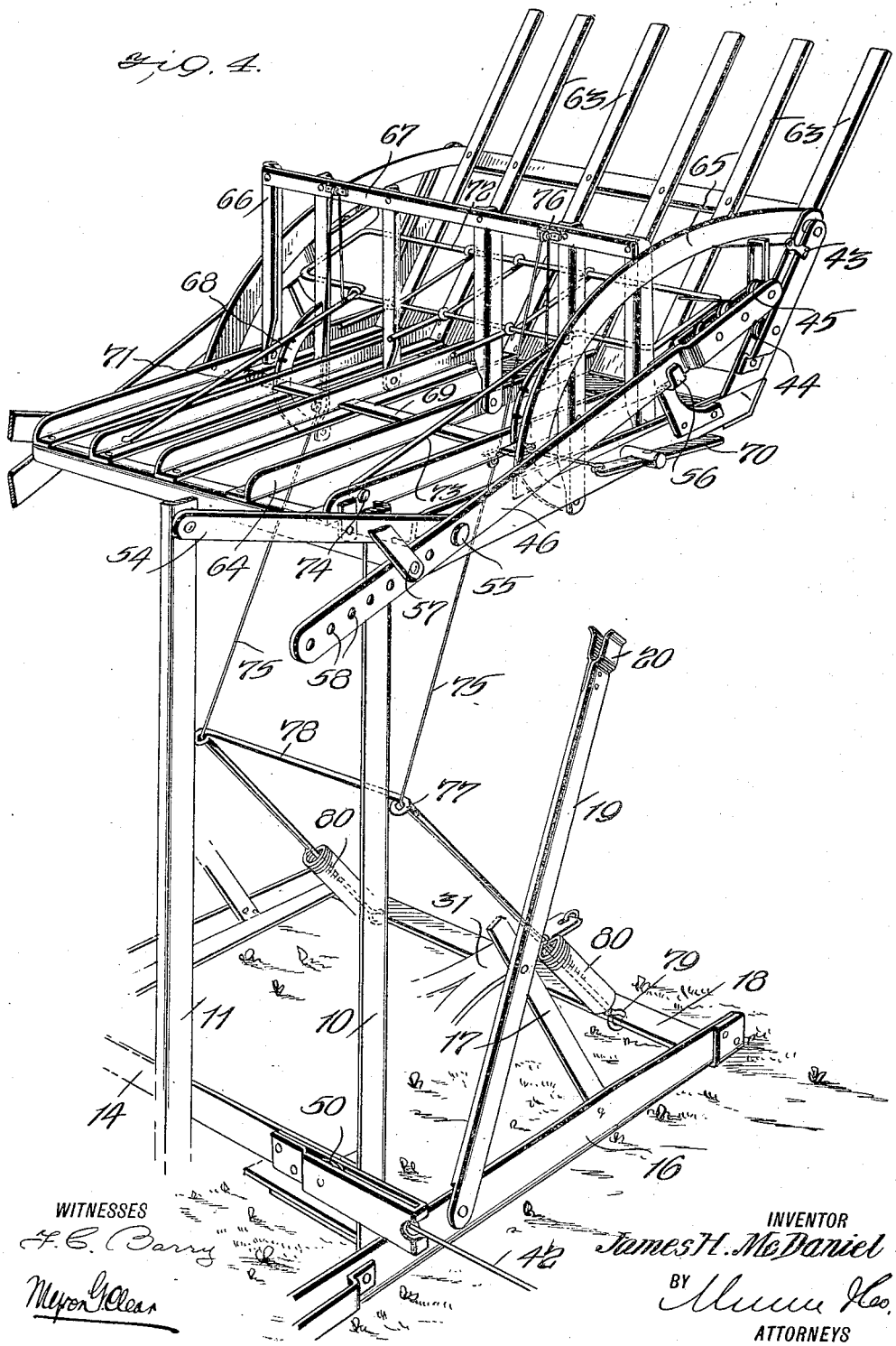

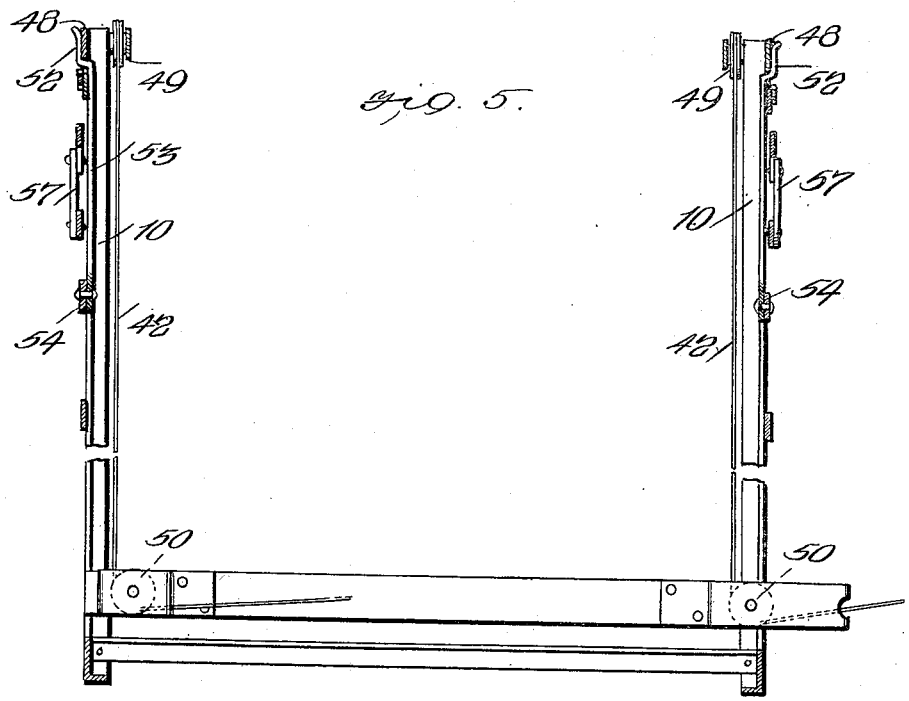
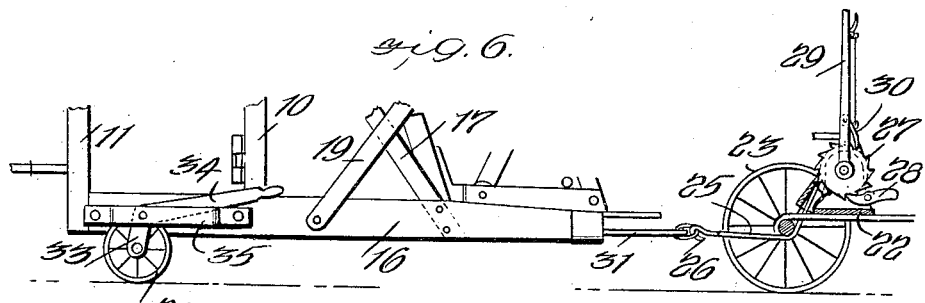
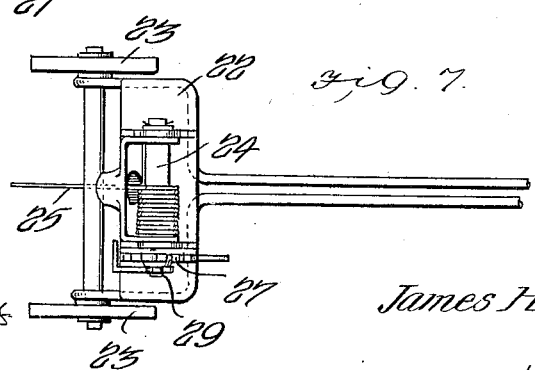

JAMES H. McDANIEL, OF WOOD LAKE, NEBRASKA.

HAY-STACKER.

1,279,736.  Specification of Letters Patent.  Patented Sept. 24, 1918.

Application filed December 29, 1916. Serial No. 139,542.

*To all whom it may concern:*

Be it known that I, JAMES H. MCDANIEL, a citizen of the United States, and a resident of Wood Lake, in the county of Cherry and State of Nebraska, have invented a certain new and useful Improvement in Hay-Stackers, of which the following is a specification.

My present invention relates generally to hay stackers, and particularly to a readily portable apparatus of this nature which may be set up at any desired point, ready for operation, my object being to generally increase the effectiveness and efficiency of devices of this character by virtue of the several improvements hereinafter specified in detail.

One of the objects of my invention is to provide a machine which, while resting directly upon the ground in use, may be elevated and wheeled, by means partially carried by the frame of the machine itself, from place to place, in order to bring about an extended range of operation.

A further object of my invention is to provide a machine having in connection therewith a stack forming cage, which may be folded within the limits of the machine when in disuse, and readily extended to operative position when desired.

A still further object of my invention is to provide a machine including a hay sling and operating connections therefor having means whereby to increase or decrease the extent of upward movement of the sling.

A still further object of my invention is to provide a machine including a hay sling of improved construction, whereby the point of discharge of the hay may be controlled and the sling entirely cleared of hay during each upward operative movement.

With these and other objects in mind, residing as they do for the most part in the details of construction, arrangement, and operation whereby the foregoing objects are carried out, and which will be better understood from the following description having reference to the acompanying drawings forming a part of this specification, and wherein—

Figure 1 is a side elevation of my improved hay stacker in operative position;

Fig. 2 is a top plan view thereof;

Fig. 3 is a vertical longitudinal section taken substantially on line 3—3 of Fig. 2, showing the sling raised in operative position;

Fig. 4 is a perspective view of the sling in raised position, with parts of the frame;

Fig. 5 is a vertical transverse section taken substantially on line 5—5 of Fig. 1;

Fig. 6 is a view partly in elevation and partly in section of the lower portion of the frame of the machine, illustrating the same elevated upon its wheels and in position for transportation, and Fig. 7 is a detail plan view of the truck removed.

Referring now to these figures, the main frame of my improved machine essentially comprises a pair of parallel forward and rear uprights 10 and 11 at each side thereof, connected at an intermediate point and at their upper ends, by means of horizontal longitudinally extending connecting bars 12 and 13, the lower ends of the two front uprights 10 being connected by a cross beam 14 and these uprights being also connected by an intermediate cross beam 15. The lower ends of the uprights 10 and 11 at each side of the frame are secured to a lower longitudinal beam 16, the forward portion of which projects forwardly beyond the front upright 10 and also forwardly beyond the lower end of a rearwardly and upwardly inclined brace 17 at each side of the frame, the upper portion of which is connected to the rear upper end of the rear upright 11.

The forward extremities of the two lower side beams 16 are connected by a cross bar 18 and the forward portions of the beams 16 also serve to support the lower rear ends of upwardly and forwardly inclined cross bars 19, secured at intermediate points to the inclined braces 17, as shown particularly in Fig. 3, and located at both sides of the main frame and provided with upper bifurcated ends 20 for a purpose to be presently described.

The main frame as thus described is adapted to rest flatwise upon a supporting surface, with its lower horizontal beams 16 directly thereon, and carries the several operating parts of the stacker to be presently described, the main frame with the operating parts carried thereby being, however, portable by means of rear side wheels 21 and a front truck 22, the latter having side wheels 23, and having a drum 24 on which is wound a flexible connection 25 having at its rear end a hook 26 as best seen in Fig. 6, the drum 24 having at one end a ratchet 27, a stationary pawl engaging the ratchet to normally prevent unwinding of the flexible connection 25, and a lever 29 with a pawl 30 in engagement with the ratchet 27, in order that the drum 24 may be turned to wind the connection thereon, the hooks 26 of the flexible connection being engageable with the forward end of a clevis bar 31 secured to the forward cross bar 18 of the main frame at a point centrally of the length of the latter, with its rearwardly diverging arms 32 connected at their rear ends to the relatively opposite ends of the rear cross bar 14, as seen in Fig. 3.

The rear side wheels 21 are mounted in the lower angular ends 33 of levers 34, fulcrumed adjacent said lower angular ends, within the rear portions of the lower horizontal beams 16 and between the same and brackets 35 secured at their ends to said beams, the upper ends of the lever 34 having handles 36 whereby they may be shifted forwardly and rearwardly to respectively raise and lower the main frame when the same is to be moved from place to place and set up for operation.

By reference to Figs. 1 and 2 in particular it will be noted that the main frame carries a stack cage, of which the rectangular side frames 37 and 38 are hingedly connected at their forward portions to the inner faces of the rear uprights 11 at opposite sides of the frame, the rear rectangular cross frame 39 of the cage being hingedly connected at one side, at 40, to the rear portion of the side frame 37, and being adapted to be coupled by a connection 41 to the rear portion of the other side frame 38, so as to complete the cage, as seen in Fig. 2, and thus inclose a space within which the stack is to be formed, between the frames 37, 38 and 39, of which the space between the side uprights forms a part, the forward extent of the stack so formed being the cross bars 14 and 15 of the main frame.

To the forward side portions of the hay sling, the details of the latter of which will be presently described, are connected the forward ends of the flexible operating connection 42, the connections of the forward ends of which at 43 with the said sling, appears in Figs. 1, 3 and 4. These flexible operating connections at opposite sides of the hay sling, extend intermediately about pulleys 44 carried by the sides of the hay sling and around pulleys 45 mounted in the forward bifurcated ends of longitudinal side levers 46 and around the pulleys 47 of upper longitudinal side levers 48, the rear ends of the operating connections 42 extending downwardly around pulleys 49 at the upper ends of the forward uprights 10, and laterally around the lower pulleys 50, to one side of the main frame, to provide for the connection therewith of the truck 22, to which the draft animals are hitched for the purpose of operating the hay sling.

The upper longitudinal lever 48 normally rests in the position shown in Fig. 1, horizontally at each side of the main frame, the rear ends of each lever being pivotally connected to the upper end of the respective rear upright 11, with its forward end supported by a bracket 51 as seen in Fig. 1, the lever being thus in engagement with the upper of said ends 52 of an upright arm 53 pivotally connected at its lower end to a lever 54, the latter of which is pivotally connected at its rear end to the respective rear upright 11 as seen in Fig. 3, and is similarly connected at its forward extremity, forwardly beyond the upright arm 53, by means of a pivot 55, to the lower longitudinal lever 46 before mentioned, at a point intermediate the ends of the latter.

In its normal position, each of the longitudinal levers 46 has its forward portion resting in the upper bifurcated end 20 of the forwardly and upwardly inclined supporting bar 19 before described, so that with the operating rope 42 guided thereby, around its pulleys 45, as seen in Fig. 1, the initial lifting movement of the hay sling will be applied directly over the load, and the raising of the load thus greatly facilitated.

The upper rear side portions of the frame of the hay sling are pivotally connected by the pivots 55 before mentioned, to the forward ends of the levers 54 and also to the intermediate points of the levers 46, so that when the sling has been raised until it contacts with the levers 46, the latter will then move upwardly with the hay sling as seen in Fig. 4, the sides of the frame of the hay sling having brackets 56 as seen in this figure, adapted to engage the said levers 46.

In this movement of the levers 46 upwardly with the hay sling, which takes place upon the pivot 55, the levers 54 are prevented from raising by virtue of the vertical arms 53 bearing at their upper ends against the levers 48. To the rear portions of the levers 46 rearwardly beyond the pivots 55, however, are connected the lower forward ends of chains or other flexible connections 57, the opposite ends of which are adjustably held in suitable manner so that when greater height of movement of the hay sling is desired, the extent of downward movement of the rear end portion of the levers 46 may be controlled so as to force the movement of the hay sling and the levers 46 more or less with the levers 54, the latter moving upon their rear pivots, so that the pivot points 55 move vertically. This latter movement is well illustrated by reference to Fig. 3, and it is obvious from this figure that, by thus forcing the levers 54 to move vertically, the pivot points 55 are raised and hence the hay sling elevated to a considerably greater height than otherwise, providing for casting of the hay from the hay sling at a greater height as the stack is built up within the cage.

To the above end, the rear end portions of the levers 46 are provided with a longitudinal series of apertures 58, in selected ones of which the lower forward ends of the connections 57 may be secured, the connections 57 in Figs. 1 and 2 appearing in the form of chains, the upper rearmost link of which is provided with several openings 59 for adjustable connections upon studs 60. It is obvious, however, that this connection may be in the form of a cable 61, as in Fig. 3, the free end of which passes downwardly around a pulley 62 at the upper end of the rear upright 11, and is suitably secured to the latter at its lower portion, so as to control the extent of lowering movement of the rear end of the respective lever 46.

The hay sling, as best seen in Fig. 4, has a frame generally rectangular in shape, supporting in its forward portion the upwardly and forwardly inclined forks 63, and supporting in its rear portion the upwardly and rearwardly inclined arms 64, the latter joining at their lower forward ends the rear lower ends of the forks 63, and the frame of the sling including the arcuate braces 65.

The upwardly projecting delivery teeth 66 are pivotally connected at their lower ends to the arms 64, and are connected at their upper ends by a cross piece 67, these delivery teeth being adjustable upon their lower pivots, in order to vary their inclination with respect to the arms 64, and thus control the point of release of the load from the hay sling when the latter is raised. To this end, certain of the teeth 66 are provided adjacent their lower ends with rigid notched quadrants 68, and through slotted openings in the arms 64 intermediate their ends, is shiftable a locking bar 69, the latter being movable in the direction of its length by means of a lever 70 at one side of the hay sling, and having notches which, when alined with the quadrants 68, permit of shifting of the several delivery teeth to and from a position at right angles with the arms 64, the locking bar 69 being movable in the notches of the quadrant 68 and being normally held by a spring 71 with its own notches out of alinement with the quadrant so as to lock the delivery teeth adjustably in position. It is apparent from the particular mounting of the teeth 66 that these teeth may be moved to a position approximately parallel with the arms 64 in order that the hay may pass completely over the teeth when it is desired to discharge the hay at a comparatively low point at the start of the stacking operation.

Forwardly of the discharging teeth 66 moreover, there is a rectangular discharging frame, best seen at 72 in Fig. 4, which, by the means presently shown, thrusts the load outwardly as the sling reaches its upper discharging position, the frame 72 having supporting arms 73 projecting rearwardly between certain of the teeth 66 and pivotally connected at 74 at their rear ends, to the rear portions of certain of the arms 64, to the forward portions of said supporting rods 73 are secured the forward ends of flexible actuating connections 75, depending around rollers 76 of the upper cross bar 67 of the teeth 66 before mentioned, and extending through the guides 77 of a U-shaped guide frame 78. This guide frame is pivotally connected at the ends of its extensions, at 79, to the forward cross bar 18 of the main frame, as seen in Fig. 4, and the extension of the guide frame 78 supports coil springs 80 to which the lower ends of the flexible connections 75 are secured, so that, as the sling approaches its upper discharge position, the springs 80 will be gradually placed under tension by virtue of the shortening of the connections 75, until the weight of the load is overcome, at which time the upward outward movement of the discharge frame 72 will progress rapidly in order to cast the hay from the sling, as is desired, clearing the discharge teeth 66 at each discharging operation.

In the practical operation of the device, the machine is transported to the desired point of operation, and lowered flatwise upon the ground, by moving the levers 34 rearwardly, controlling the rear side wheels 21, and by detaching the truck 22 from the forward portion of the frame. The cage, including the side and end frames 37, 38, and 39, is then swung outwardly to, and locked within, the position shown in Fig. 2, and the chains 57 or the cable 61 loosened to permit of independent movement of the levers 46. The delivery teeth 66 are then released and adjusted to their rearmost positions, at acute angles with respect to the arms 64, and the sling is then ready for operation to discharge hay into the cage in the initial formation of the stack.

As the stack increases in height the delivery teeth are first adjusted to their intermediate position, in order to discharge the hay at a higher point than at first, and are then adjusted to their positions at right angles or approximately so, with respect to the arms 64, as shown in Fig. 4, in order to discharge the hay at a still higher point. As the stack still increases in height, the chains 57 or cable 61 are adjusted so as to check lowering movement of the rear portions of the levers 46, and, as before explained, cause movement of the levers 54 with the sling, so as to shift the pivots 55 vertically and elevate the hay sling to a greater extent, so that when the hay sling has, in the last instance, been shifted to its highest point of movement, the finished stack may be properly topped off as desired.

It is obvious from the foregoing that the several details of construction previously described, in themselves promote greater efficiency and increase effectiveness of an apparatus of the nature described, particularly of the present type, and that in addition to their several independent advantages, the construction as set forth combines to provide a machine of this type, the frame of which need not be of any considerable height even though providing, as it does, for maximum lift of the hay sling. Due to this fact, the frame when transported, will be stable and firm without tendency to top heaviness, may be readily drawn beneath the branches of moderate sized trees, beneath telephone wires, and other obstacles of this nature which would indeed be obstacles to the progress of frames of the size at present utilized. It is obvious that in the transportation of the machine from place to place, the side and end frames of the cage are folded inwardly into the space between the sides of the main frame, between the uprights 10 and 11.

I claim:

1. In a hay stacker, a main frame, a hay sling movable therein and including front forks and rear arms, delivery teeth carried by the arms, and a hay discharging frame pivoted to said arms and movable with respect to the sling, said discharging frame being movable along the delivery teeth and having flexible controlling connections, and springs anchored upon a portion of the main frame and to which said connections are attached.

2. In a hay stacker, a main frame, a hay sling movable therein and including front forks and rear arms, delivery teeth carried by the arms, and a hay discharging frame normally in the plane of, and movable with respect to, the said arms, said frame being disposed forwardly of the delivery teeth and shiftable outwardly therealong and having resilient connections with the main frame.

3. In a hay stacker, a main frame, a hay sling movable therein and including front forks and rear arms, delivery teeth carried by the arms, and a hay discharging frame normally in the plane of, and movable with respect to, the arms, said frame being disposed forwardly of the delivery teeth to move outwardly therealong and having rearwardly projecting rods pivotally connected to the rear portions of certain of the said arms, and resilient connections between the discharge frame and the main frame.

4. In a hay stacker, a hay sling having forward forks and rear inclined arms, and a plurality of upstanding delivery teeth pivoted to said arms and adjustable with respect thereto, notched quadrants rigidly secured to said delivery teeth, a notched locking bar carried by said arms to coöperate with said notched quadrant, and means for moving said bar to engage and release said delivery teeth.

5. In a hay stacker, a main frame, a hay sling movable therein, a pair of pivoted side levers intermediate the ends of which the sling is pivoted at its rear portion, flexible operating connections attached to said sling, said levers being in the path of movement of said sling and having guides for said operating connections in the forward portions thereof, and rigid supports carried by the main frame and loosely engaging said lever to hold the latter in elevated position.

6. In a hay stacker, a main frame, a hay sling movable therein, a pair of side levers pivoted to said sling and extending forwardly above and in the path of movement of the sling, flexible connections for raising and lowering the sling, guides for said connections, carried by the forward ends of said levers, a second pair of levers pivoted to the main frame and to said sling, and adjustable connections between the frame and said first named levers for controlling movement of said last named levers.

7. In a hay stacker, a main frame, a hay sling movable therein, flexible connections attached to the hay sling for raising and lowering the same, a pair of side levers pivotally connected to and extending forwardly above and in the path of movement of the sling and having guides for the flexible operating connections, a pair of levers pivoted to the main frame and to the said sling, and with respect to which the said sling and the first named levers are movable in unison, means whereby to normally prevent movement of said last named levers with respect to the main frame, and adjustable connections between the frame and said first named levers for checking movement of the first named levers with respect to the last named levers whereby to cause movement of the latter with the sling.

8. In a hay stacker, a main frame, levers pivoted at their rear ends to the main frame, a hay sling pivoted to the forward ends of said levers and movable in the frame, levers intermediately pivoted to the forward ends of said first named levers, and with the forward portions of which the sling is engageable in its upward movement, means to normally prevent movement of the first named levers with respect to the main frame, and adjustable means engaging the rear portions of the last named levers whereby to check relative movement of the frame and the sling with respect to the first named levers.

JAMES H. McDANIEL.

Witnesses:
L. R. APPLEGATE,
C. A. SHERMAN.